United States Patent
Chisholm et al.

(10) Patent No.: US 6,833,176 B2
(45) Date of Patent: Dec. 21, 2004

(54) RADIATION CURABLE MICROSTRUCTURE-BEARING ARTICLES

(75) Inventors: Bret Ja Chisholm, Clifton Park, NY (US); Daniel Robert Olson, Voorheesville, NY (US); Grant Hay, Evansville, IN (US); Chris Anthony Molaison, Schenectady, NY (US); Tiberiu Mircea Siclovan, Rexford, NY (US); James Alan Resue, Scotia, NY (US); Dennis Joseph Coyle, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 60 days.

(21) Appl. No.: 10/336,493

(22) Filed: Jan. 6, 2003

(65) Prior Publication Data

US 2004/0131826 A1 Jul. 8, 2004

(51) Int. Cl.$^7$ .............................. G02B 1/00; B32B 3/00
(52) U.S. Cl. ....................... 428/156; 428/167; 359/580; 359/584; 359/459; 522/173; 522/175; 522/182; 522/183
(58) Field of Search ................................. 428/1.1–1.62, 428/156, 141, 167; 359/457, 456, 459, 599, 837, 584; 522/175, 182, 173

(56) References Cited

U.S. PATENT DOCUMENTS

| 4,576,850 | A | | 3/1986 | Martens |
| 5,175,030 | A | | 12/1992 | Lu et al. |
| 5,183,597 | A | | 2/1993 | Lu |
| 5,626,800 | A | | 5/1997 | Williams et al. |
| 5,635,278 | A | | 6/1997 | Williams |
| 5,650,215 | A | * | 7/1997 | Mazurek et al. ............ 428/156 |
| 5,716,681 | A | | 2/1998 | Williams |
| 5,900,287 | A | | 5/1999 | Williams |

FOREIGN PATENT DOCUMENTS

WO       9850805       11/1998

* cited by examiner

*Primary Examiner*—Susan Berman
(74) *Attorney, Agent, or Firm*—Andrew J. Caruso; Patrick K. Patnode

(57) ABSTRACT

Blends of monofunctional and multifunctional (meth) acrylate monomers, optionally in addition to oligomeric multifunctional (meth)acrylates), can be cured by ultraviolet radiation in contact with a photoinitiator to produce optical resinous articles having a glass transition temperature of at least 35° C. and having physical properties making them suitable for use as microstructure-bearing articles.

28 Claims, 2 Drawing Sheets

RADIATION CURABLE MICROSTRUCTURE-BEARING ARTICLES

BACKGROUND OF THE INVENTION

This invention relates to the replication of microstructure-bearing surfaces, and more particularly to a genus of resinous compositions capable of such replication.

Microstructure replication in resinous surfaces is of importance in such diverse technical fields as the fabrication of traffic signs, in which reflectivity is provided by cube-corner embossed sheeting; the production of Fresnel ophthalmic lens elements and flexible video disks; and the fabrication of "brightness enhancement" or "light management" films (hereinafter sometimes designated "LMF" for brevity) for liquid crystal displays. For replication purposes, it is necessary that the resin have optimum physical properties, including a glass transition temperature (Tg) high enough for shape retention during storage and use and viscoelastic properties facilitating shaping, typically by molding, and long-term shape retention which includes the microstructure aspects of the shaped articles. Suitable viscoelastic properties include moduli in the glassy and rubbery states within certain ranges, as well as suitable transition temperatures between those states.

Many suitable resinous compositions for the replication of microstructure are disclosed in the patent literature. A patent whose disclosure is generic to a large variety of such compositions is U.S. Pat. No. 4,576,850. The compositions described therein are characterized by "hard" and "soft" segments or moieties in combination with radiation-polymerizable moieties. Most often, all three of these types of segments are present in the same molecule. A key feature of the "hard" segments is the presence therein of cyclic (i.e., carbocyclic or heterocyclic) groups. Later-issued patents frequently make reference to U.S. Pat. No. 4,576,850 for its disclosure of suitable polymeric compositions and precursors therefor.

It is of interest, however, to develop additional resinous LMF materials not disclosed in the above-identified patent or other publications.

SUMMARY OF THE INVENTION

The present invention is based on the discovery of a genus of acrylic-based resinous materials having excellent properties for the fabrication of LMF's and other articles having microstructure.

The invention includes articles which are radiation curable to optical resinous articles having surfaces with a replicated microstructure comprising a plurality of utilitarian discontinuities having an optical purpose, said optical resinous articles having a glass transition temperature of at least 35° C. Also included are the cured optical resinous articles so prepared.

Said radiation curable articles are free from carbocyclic and heterocyclic polymerizable moieties and comprise:

(A) at least one monofunctional acrylic monomer selected from the group consisting of:
  (1) at least one monomeric t-alkyl (meth)acrylate,
  (2) at least one monomeric N-substituted or N,N-disubstituted (meth)acrylamide and
  (3) at least one $C_{1-8}$ primary or secondary alkyl (meth)acrylate;
(B) at least one multifunctional (meth)acrylate or (meth)acrylamide monomer;
(C) optionally, at least one oligomeric multifunctional (meth)acrylate; and
(D) at least one photoinitiator.

DETAILED DESCRIPTION; PREFERRED EMBODIMENTS

Figure 1:
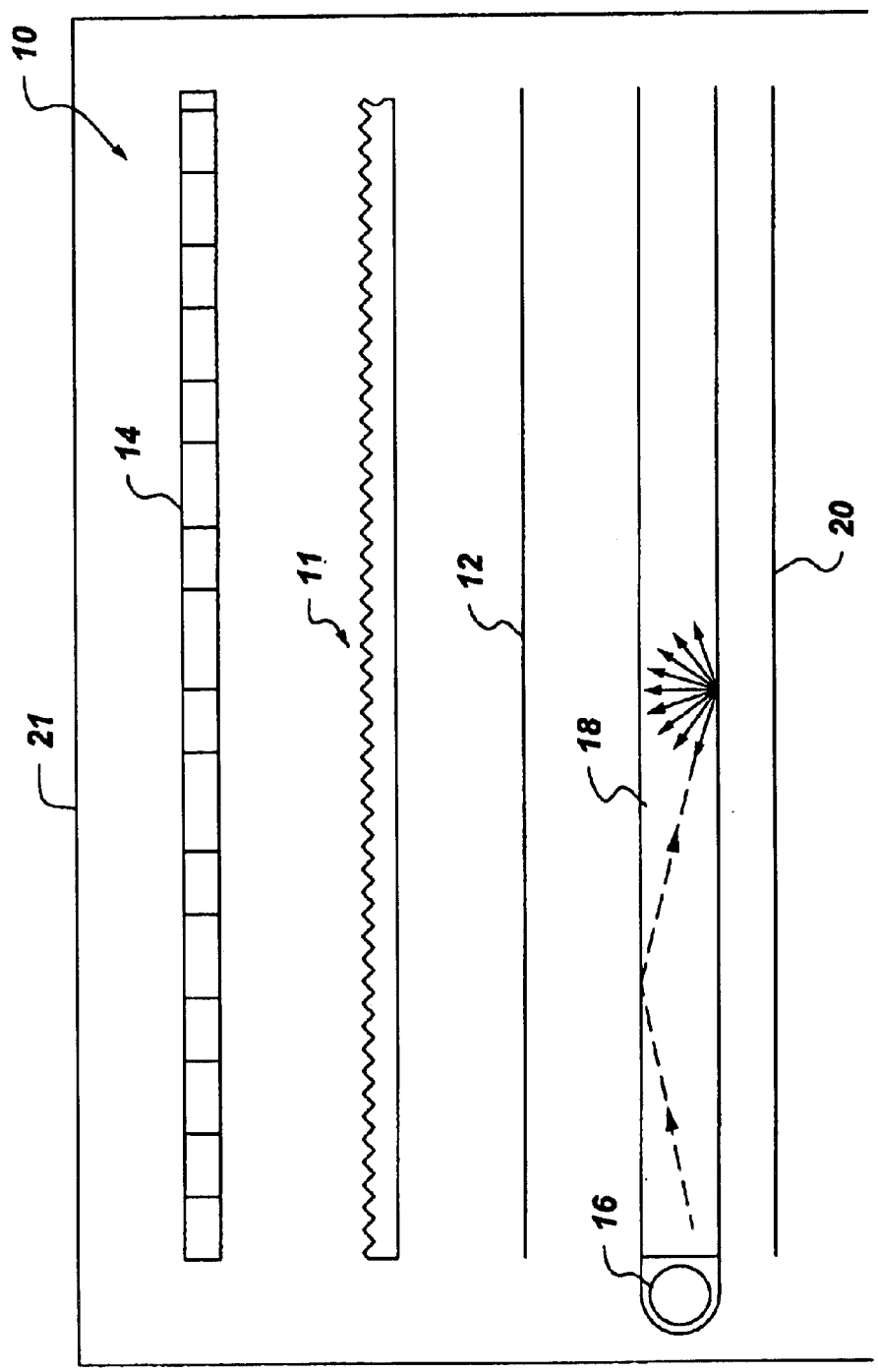
FIG. 1 is a schematic view of a LMF in a backlit liquid crystal display.

The optical resinous articles of the present invention are characterized by a surface with replicated microstructure comprising a plurality of utilitarian discontinuities, such as projections and depressions, which surface may be readily released from a mold after radiation curing without loss of the detail of the mold and with retention of the replication of such detail under a wide variety of conditions during use. The articles have a wide variety of desired properties, such as toughness, flexibility, optical clarity and homogeneity, and resistance to common solvents. The microstructures of such articles have high thermal dimensional stability, resistance to abrasion and impact, and integrity even when the articles are bent to an angle as great as 180°.

The term "microstructure" is used herein as defined and explained in the aforementioned U.S. Pat. No. 4,576,850, the disclosure of which is incorporated by reference herein. Thus, it means the configuration of a surface which depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about ±0.005 to ±750 microns through a representative characteristic length of the surface, e.g., 1–30 cm, as measured by an optical or electron microscope. Said average center line can be piano, concave, convex, aspheric or combinations thereof. Articles where said deviations are of low order, e.g., from ±0.005 to ±0.1 or, preferably, to ±0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high order, e.g., from ±0.1 to ±750 microns, and attributable to microstructure comprising a plurality of utilitarian discontinuities which are the same or different and spaced apart or contiguous in a random or ordered manner, are articles such as retroreflective cube-corner sheeting, linear Fresnel lenses, video discs and LMF's. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles. It may be necessary or desirable to select a particular oligomeric composition whose shrinkage upon curing does not result in such interfering extraneous discontinuities, e.g., a composition which shrinks only 2–6%.

Details of LMF construction and configuration are provided, for example, in U.S. Pat. No. 5,900,287, the disclosure of which is also incorporated by reference herein. Referring to FIG. 1, a backlit liquid crystal display generally indicated at 10 includes a LMF 11 which is typically positioned between a diffuser 12 and a liquid crystal display panel 14. The backlit liquid crystal display also includes a light source 16 such as a fluorescent lamp, a light guide 18 for transporting light for reflection toward the liquid crystal display panel 14, and a white reflector 20 for reflecting light also toward the liquid crystal display panel. The LMF 11 collimates light emitted from the light guide 18 thereby increasing the brightness of the liquid crystal display panel 14, enabling a sharper image to be produced by the liquid crystal display panel and allowing the power of the light source 16 to be reduced to produce a selected brightness. The LMF 11 in the backlit liquid crystal display is useful in equipment such as computers, personal televisions, video recorders, mobile communication devices, and automobile and avionic instrument displays.

The articles of the invention are radiation curable. This includes the situation where only a portion of the article, usually the microstructure-bearing coating, is actually cured, the substrate and/or other portions of the article remaining unchanged before, during and after the radiation curing operation. An important feature of said articles is the material of which they are fabricated. Said material has three essential components, all polymerizable components therein being free from carbocyclic and heterocyclic moieties. Component A is at least one monofunctional acrylic monomer which is itself selected from four groups. The term "acrylic monomer" as used herein designates esters and amides of acrylic and methacrylic acids, the inclusion of both acids being designated by the parenthesized construction "(meth) acrylic".

Group 1 of component A includes monomeric t-alkyl (meth)acrylates; i.e., alkyl (meth)acrylates having a tertiary carbon atom attached to the alkoxy oxygen atom. For the most part these are $C_{4-8}$ alkyl (meth)acrylates, with t-butyl (meth)acrylates being particularly preferred and t-butyl acrylate being most preferred.

Group 2 includes monomeric N-substituted and N,N-disubstituted (meth)acrylamides, especially acrylamides. These include N-alkylacrylamides and N,N-dialkylacrylamides, especially those containing $C_{1-4}$ alkyl groups. Particularly preferred are N-isopropylacrylamide, N-t-butylacrylamide, N,N-dimethylacrylamide and N,N-diethylacrylamide.

Group 3 includes $C_{1-8}$ primary and secondary alkyl (meth)acrylates which may contain substituents on the alkyl groups. Illustrative unsubstituted compounds are methyl acrylate, methyl methacrylate, ethyl acrylate and 1-propyl acrylate. Illustrative substituted compounds, which may also function as reactive diluents, are the 2-(N-butylcarbamyl) ethyl (meth)acrylates. The $C_{1-3}$ (meth)acrylates are usually preferred, with methyl acrylate and ethyl acrylate being most preferred. Other suitable reactive diluents are enumerated in the aforementioned U.S. Pat. No. 4,576,850.

The radiation curable compositions forming the articles of the invention also include component B, which is at least one multifunctional (meth)acrylate or (meth)acrylamide monomer and which serves as a crosslinking agent. By "multifunctional (meth)acrylate monomer" is meant a monomeric (i.e., non-polymerized) compound containing more than one (meth)acrylic group.

Compounds suitable for use as component B include polyol poly(meth)acrylates, typically prepared from aliphatic diols, triols and/or tetraols containing 2–10 carbon atoms. Examples of suitable poly(meth)acrylates are ethylene glycol diacrylate, 1,6-hexanediol diacrylate, 2-ethyl-2-hydroxymethyl-1,3-propanediol triacrylate (trimethylolpropane triacrylate), di(trimethylolpropane) tetraacrylate, pentaerythritol tetraacrylate, the corresponding methacrylates and the (meth)acrylates of alkoxylated (usually ethoxylated) derivatives of said polyols. Also included are N,N'-alkylenebisacrylamides, particularly those containing a $C_{1-4}$ alkylene group. Particularly preferred is N,N'-methylenebisacrylamide.

Optional component C, when present, may serve the purposes of affording improved ductility and minimizing shrinkage upon polymerization. It is at least one oligomeric multifunctional (meth)acrylate, usually a di(meth)acrylate. Suitable materials for component C include the oligomeric polyether di(meth)acrylates having a glass transition temperature of at most 23° C. Examples are poly(ethylene glycol) and poly(propylene glycol) di(meth)acrylates, typically having molecular weights in the range of about 300–1,000. Compounds of this type are commercially available under several trade names. Also included are di(meth) acrylates of polyester polyols and oligomers thereof, as exemplified by such commercially available compounds as "CN-292", a low viscosity polyester acrylate oligomer commercially available from Sartomer Co.

Optional component C may also be an oligomeric urethane di(meth)acrylate. Such materials may be prepared, for example, by the reaction of an alkylene diisocyanate of the formula OCN—$R^3$—NCO with a diol of the formula HO—$R^4$—OH, wherein each of $R^3$ and $R^4$ is independently a $C_{2-100}$ alkylene group, to form a urethane diol diisocyanate, followed by reaction with a hydroxyalkyl (meth)acrylate. For example, a preferred compound of this type may be prepared from 2,2,4-trimethylhexylene diisocyanate, poly(caprolactone)diol and 2-hydroxyethyl methacrylate.

Component D of the radiation curable articles of this invention is at least one photoinitiator effective to promote polymerization of said articles upon exposure to ultraviolet radiation. Suitable materials for use as photoinitiators are identified in the aforementioned U.S. Pat. No. 4,576,850 and in such reference works as *Encyclopedia of Polymer Technology*. Examples are benzoin ethers, hydroxy- and alkoxyalkyl phenyl ketones, thioalkylphenyl morpholinoalkyl ketones and acylphosphine oxides. Particularly useful in many instances is a commercially available material designated "Darocur 4265", comprising a mixture of 2-hydroxy-2-propyl phenyl ketone and (2,4,6-trimethylbenzoyl) diphenylphosphine oxide.

Other important features of the invention are the properties of the optical resinous articles formed by curing. These include a glass transition temperature (Tg) of at least 35° C., preferably at least 40° C. Cured articles having glass transition temperatures lower than 35° C. are not within the scope of the invention.

Figure 2:
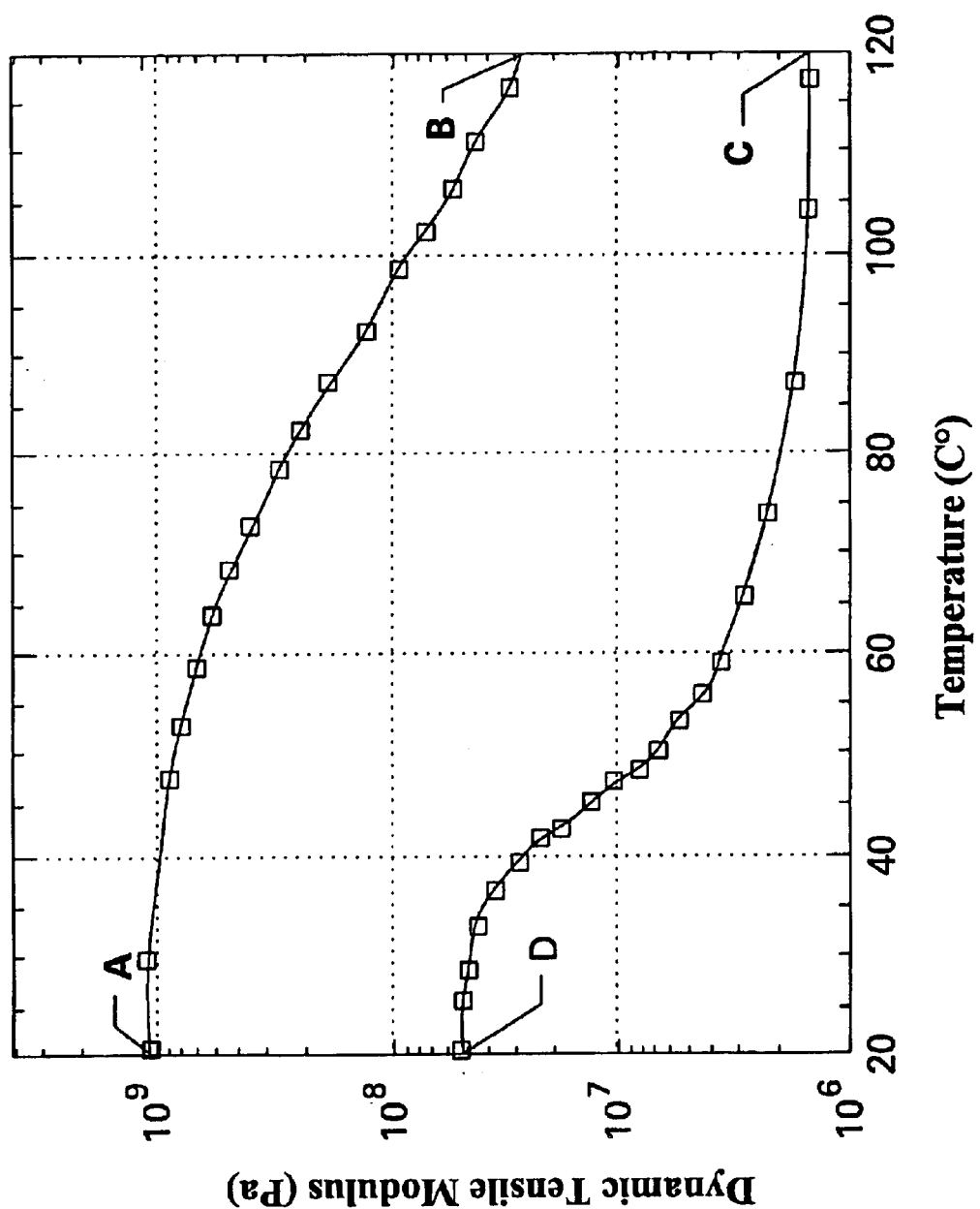
FIG. 2 is a plot of the preferred dynamic tensile moduli of illustrative cured articles prepared according to the invention.

Other preferred properties include a tensile strength in the range of about 70–700 kg/cm², a modulus of elasticity in the range of about 140–14,000 kg/cm²; an elongation to break in the range of about 5–300%, an optical homogeneity of at least about 91% transmission, a haze value of less than about 5%, a birefringence of less than about 0.002 and a dynamic tensile modulus, E', that falls within the boundary of the area A-B-C-D in FIG. 2. Said figure is a modified version of FIG. 1 of the aforementioned U.S. Pat. No. 4,576,850, converting dynamic shear modulus (G') in dynes/cm to dynamic tensile modulus in Pascals.

The proportions of the components forming the curable articles of this invention may be widely varied, subject only to the Tg limitation and, preferably, one or more of the other preferred property profiles described hereinabove. Most often, components A and B each constitute about 1–98% by weight and component C, when present, about 5–75% of the article, based on total polymerizable components (usually the total of components A, B and C). Component D, the photoinitiator, is present in a minor amount effective to promote polymerization upon exposure to ultraviolet radiation, generally in the range of about 0.005–3.0% and preferably about 0.005–1.0% based on total polymerizable components.

The radiation curable articles of this invention may be prepared by simply blending the components thereof, with efficient mixing to produce a homogeneous mixture. It is often preferred to remove air bubbles by application of vacuum or the like, with gentle heating if the mixture is viscous, and casting or otherwise creating a film of the resulting blend on a desired surface. The film can then be charged to a mold bearing the microstructure to be replicated and polymerized by exposure to ultraviolet radiation, producing cured optical resinous articles of the invention having the aforementioned properties. If polymerized on a surface other than the one on which it is to be used, the optical resinous article can be transferred to another surface.

Such a polymerization process lends itself to rapid, mass production of articles with no adverse environmental impact because no or only a minor amount of solvent or other volatiles are evolved and the polymerization can be carried out at ambient temperatures and pressures. The process also lends itself to replication of articles with microstructure comprising utilitarian discontinuities, such as projections and depressions, which are readily released from the mold without loss of the detail of the mold and with retention of the replication of such detail under a wide variety of conditions during use. The articles can be formed with a wide variety of desired properties, such as toughness, flexibility, optical clarity and homogeneity, and resistance to common solvents, the microstructure of such articles having high thermal dimensional stability, resistance to abrasion and impact, and integrity even when the articles are bent.

The invention is illustrated by the following examples. All parts and percentages are by weight unless otherwise indicated. Percentages of monomeric constituents and of photoinitiator are based on total monomeric constituents. Dynamic tensile moduli in all examples fell within the region A-B-C-D of FIG. 2.

EXAMPLES 1–5

To a 3-necked flask equipped with an addition funnel, temperature probe and mechanical stirrer was charged 31.2 ml of 2,2,4-trimethylhexane 16-diisocyanate and 50 mg of dibutyltin dilaurate. The addition funnel was charged with 39.75 g of warm polycaprolactone diol (Mn. 530), which was added to the contents of the flask at 55–60° C. The mixture was then stirred at 65° C. for 14 hours. The flask was then cooled to 55° C. and a mixture of 18.7 ml of 2-hydroxyethyl methacrylate and 100 mg hydroquinone monomethyl ether was added while maintaining the temperature in the range of 54–58° C. The mixture was stirred at 55° C. for 10–12 hours until completion of the reaction was verified by infrared spectroscopy. The product was the desired oligomeric urethane dimethacrylate, hereinafter sometimes designated "oligomer dimethacrylate".

In each example, a mixture of oligomer dimethacrylate, methyl methacrylate and, in some examples, pentaerythritol triacrylate in a total amount of 5–10 g were weighed into a scintillation vial and 3% of "Darocur 4265" photoinitiator was added. The components were mixed with a vortex mixer. The uncapped scintillation vial was placed in a vacuum oven and the oven evacuated to remove air bubbles from the solution. If the coating mixture was highly viscous, the temperature of the vacuum oven was increased to 50° C. to facilitate the removal of air bubbles. Approximately one gram of the mixture was then poured into an aluminum pan 5 cm in diameter. The pan was tilted to spread the mixture across the entire bottom of the pan. If the mixture was viscous, the pan was placed in a circulating air oven set at 80° C. to heat the mixture, which allowed for easier spreading of the mixture across the bottom of the pan. The spread and leveled solution was then polymerized by ultraviolet radiation in an ultraviolet processor. Two 600-watt bulbs were used with a belt speed of 12 ft./min, lamp to belt distance of 4 inches, and the coating was passed 10 times through the processor. A culture dish was placed upside down over the aluminum pan containing the coating in order to prevent the pan from being blown around on the belt.

The product films were analyzed for glassy plateau modulus (G), rubbery plateau modulus (R) and glass transition temperature (Tg) using a Rheometrics Solids Analyzer. The results are given in Table I.

TABLE I

| | Example | | | | |
|---|---|---|---|---|---|
| | 1 | 2 | 3 | 4 | 5 |
| Oligomer dimethacrylate, % | 30.9 | 51.6 | 51.6 | 72.2 | 72.2 |
| Methyl methacrylate, % | 63.9 | 48.4 | 43.3 | 27.8 | 22.7 |
| Pentaerythritol triacrylate, % | 5.2 | — | 5.1 | — | 5.1 |
| G, MPa | 1,420 | 1,110 | 1,000 | 734 | 1,170 |
| R, MPa | 8.1 | 4.7 | 10.3 | 7.7 | 16.6 |
| Tg, ° C. | 91 | 58 | 81 | 48 | 59 |

EXAMPLES 6–14

The polymerization procedure of Examples 1–5 was performed on a series of mixtures of t-butyl acrylate with, in various examples, "CN-292" polyester acrylate, tetraethylene glycol diacrylate, trimethylolpropane triacrylate and ethoxylated trimethylolpropane triacrylate and employing 0.01% of photoinitiator. The results are given in Table II.

TABLE II

| | Example | | | | | | | | |
|---|---|---|---|---|---|---|---|---|---|
| | 6 | 7 | 8 | 9 | 10 | 11 | 12 | 13 | 14 |
| t-Butyl acrylate, % | 95 | 90 | 95 | 90 | 95 | 95 | 90 | 95 | 90 |
| "CN-292" polyester acrylate, % | 5 | 10 | — | — | — | — | — | — | — |
| Tetraethylene glycol diacrylate, % | — | — | 5 | 10 | — | — | — | — | — |
| Trimethylolpropane triacrylate, % | — | — | — | — | 5 | — | — | — | — |
| Ethoxylated trimethylolpropane triacrylate, % | — | — | — | — | — | — | — | 5 | 10 |
| Di-(trimethylolpropane) tetraacrylate, % | — | — | — | — | — | 5 | 10 | — | — |
| G, MPa | 1,080 | 1,960 | 1,450 | 1,450 | 1,210 | 849 | 1,560 | 1,140 | 920 |
| R, MPa | 0.7 | 2.8 | 1.3 | 3.1 | 1.8 | — | — | 1.2 | 3.6 |
| Tg, °C. | 55 | 67 | 56 | 60 | 73 | 71 | 83 | 62 | 72 |

EXAMPLES 15–24

The polymerization procedure of Examples 6–14 was performed on a series of mixtures of N,N-dimethylacrylamide or N,N-diethylacrylamide; with, in various examples, N,N-methylenebisacrylamide and 1,6-hexanediol diacrylate. The results are given in Table III.

TABLE III

| | Example | | | | | | | | | |
|---|---|---|---|---|---|---|---|---|---|---|
| | 15 | 16 | 17 | 18 | 19 | 20 | 21 | 22 | 23 | 24 |
| N,N-Diethylacrylamide, % | 95 | 90 | — | — | — | — | 71.4 | 68.2 | — | — |
| N,N-Dimethylacrylamide, % | — | — | 95 | 90 | 95 | 90 | — | — | — | — |
| N-t-Butylacrylamide, % | — | — | — | — | — | — | 23.8 | 22.7 | — | — |
| N-Isopropylacrylamide, % | — | — | — | — | — | — | — | — | 47.6 | 71.4 |
| N,N-Methylenebis-acrylamide, % | — | — | — | — | 5 | 10 | — | — | — | — |
| t-Butyl acrylate, % | — | — | — | — | — | — | — | — | 47.6 | 23.8 |
| 1,6-Hexanediol diacrylate, % | 5 | 10 | 5 | 10 | — | — | 4.8 | 9.1 | 4.8 | 4.8 |
| G, MPa | 89,300 | 10,700 | 10,700 | 19,000 | 10,400 | 20,200 | 10,000 | 8,660 | 11,400 | 12,100 |
| R, MPa | 20.0 | 60.7 | 21.9 | 63.1 | 25.5 | 20.6 | — | 71.2 | 26.3 | 32.5 |
| Tg, °C. | 114 | 113 | 155 | 157 | 180 | 198* | 145 | 144 | 128 | 156 |

*Second Tg at 232° C.

EXAMPLES 25–31

The polymerization procedure of Examples 6–14 was performed on a series of mixtures of t-butyl acrylate and 1,6-hexanediol diacrylate and, in various examples, poly(propylene glycol Mn 540) diacrylate and the oligomer dimethacrylate of Example 1. The results are given in Table IV.

TABLE IV

| | Example | | | | | | |
|---|---|---|---|---|---|---|---|
| | 25 | 26 | 27 | 28 | 29 | 30 | 31 |
| t-Butyl acrylate, % | 85 | 80 | 75 | 20 | 35 | 50 | 70 |
| 1,6-Hexanediol diacrylate, % | 10 | 10 | 10 | 10 | 10 | 10 | 10 |
| Poly(propylene glycol) diacrylate, % | 5 | 10 | 15 | — | — | — | — |
| Oligomer dimethacrylate, % | — | — | — | 70 | 55 | 40 | 20 |
| G, MPa | 6,100 | 9,800 | 14,000 | — | 11,000 | 17,000 | 15,000 |
| R, MPa | 41 | 36 | 47 | 14 | 100 | 88 | 59 |
| Tg, °C. | 64.5 | 57.5 | 47.7 | 38 | 38 | 44 | 53 |

EXAMPLES 32–38

The polymerization procedure of Examples 6–14 was performed on a series of mixtures of N,N-dimethylacrylamide, 1,6-hexanediol diacrylate and, in various examples, poly(propylene glycol Mn 540) diacrylate and the oligomer dimethacrylate of Example 1. The results are given in Table V.

TABLE V

|  | Example | | | | | | |
|---|---|---|---|---|---|---|---|
|  | 32 | 33 | 34 | 35 | 36 | 37 | 38 |
| N,N-Dimethylacrylamide, % | 85 | 80 | 75 | 20 | 35 | 50 | 70 |
| 1,6-Hexanediol diacrylate, % | 10 | 10 | 10 | 10 | 10 | 10 | 10 |
| Poly(propylene glycol) diacrylate, % | 5 | 10 | 15 | — | — | — | — |
| Oligomer dimethacrylate, % | — | — | — | 70 | 55 | 40 | 20 |
| G, MPa | 7,600 | 11,000 | 20,000 | 26,000 | 18,000 | 17,000 | 13,000 |
| R, MPa | 58 | 59 | 78 | 190 | 150 | 105 | 65 |
| Tg, ° C. | 151 | 136 | 116 | 63 | 74 | 88 | 106 |

EXAMPLES 39–42

The polymerization procedure of Examples 6–14 was performed on a series of mixtures of N,N-dimethylacrylamide, t-butyl acrylate, 1,6-hexanediol diacrylate and poly(propylene glycol Mn 540) diacrylate. The results are given in

TABLE VI

|  | Example | | | |
|---|---|---|---|---|
|  | 39 | 40 | 41 | 42 |
| N,N-Dimethylacrylamide, % | 42.5 | 37.5 | 40 | 37.5 |
| t-Butyl acrylate, % | 42.5 | 37.5 | 40 | 37.5 |
| 1,6-Hexanediol diacrylate, % | 10 | 20 | 10 | 10 |
| Poly(propylene glycol) diacrylate, % | 5 | 5 | 10 | 15 |
| G, MPa | 12,000 | 860 | 840 | 870 |
| R, MPa | 43 | — | 63 | 80 |
| Tg, ° C. | 115 | 124 | 105 | 91 |

What is claimed is:

1. An optical article having a surface with a replicated microstructure comprising a plurality of utilitarian discontinuities having an optical purpose, said optical article comprising an organic resin having a glass transition temperature of at least 35° C.;
   said resin being free from carbocyclic and heterocyclic polymerizable moieties and said resin being prepared by curing a radiation curable composition comprising
   (A) at least one monofunctional acrylic monomer comprising
      (1) at least one monomeric t-alkyl (meth)acrylate,
      (2) optionally one or more monomeric N-substituted or N,N-disubstituted (meth)acrylamide and
      (3) optionally one or more $C_{1-8}$ primary or secondary alkyl (meth)acrylate;
   (B) at least one multifunctional (meth)acrylate or (meth)acrylamide monomer;
   (C) optionally, at least one oligomeric multifunctional (meth)acrylate; and
   (D) at least one photoinitiator.

2. An article according to claim 1 which is radiation curable to an optical resinous article having a glass transition temperature of at least 40° C.

3. An article according to claim 1 having a dynamic tensile modulus that falls within the boundary of the area A-B-C-D in FIG. 2.

4. An article according to claim 1 wherein component A-1 is a t-butyl (meth)acrylate.

5. An article according to claim 1 comprising component A-2.

6. An article according to claim 5 wherein component A-2 is N-isopropylacrylamide, N-t-butylacrylamide, N,N-dimethylacrylamide or N,N-diethylacrylamide.

7. An optical article according to claim 5 wherein said curing is carried out using ultraviolet radiation.

8. An article according to claim 1 comprising component A-3.

9. An article according to claim 8 wherein component A-3 is methyl acrylate, methyl methacrylate, ethyl acrylate, 1-propyl acrylate or a 2-(N-butylcarbamyl)ethyl (meth)acrylate.

10. An optical article according to claim 8 wherein said curing is carried out using ultraviolet radiation.

11. An article according to claim 1 wherein component B is at least one polyol poly(meth)acrylate.

12. An article according to claim 11 wherein component B is ethylene glycol di(meth)acrylate, 1,6-hexanediol di(meth)acrylate. 2-ethyl-2-hydroxymethyl- 1,3-propanediol tri(meth)acrylate, di(trimethylolpropane) tetra (meth)acrylate or pentaerythritol tetra(meth)acrylate.

13. An optical article according to claim 11 wherein said curing is carried out using ultraviolet radiation.

14. An article according to claim 1 wherein component B is at least one N,N'-alkylenebisacrylamide.

15. An article according to claim 14 wherein component B is N,N'-methylenebisacrylamide.

16. An optical article according to claim 14 wherein said curing is carried out using ultraviolet radiation.

17. An article according to claim 1 comprising component C.

18. An article according to claim 17 wherein component C is an oligomeric polyether di(meth)acrylate having a glass transition temperature of at most 23° C.

19. An article according to claim 17 wherein component C is a di(meth)acrylate of a polyester polyol or an oligomer thereof.

20. An optical article according to claim 17 wherein said curing is carried out using ultraviolet radiation.

21. An article according to claim 19 wherein component C is poly(ethylene glycol) di(meth)acrylate or poly (propylene glycol) di(meth)acrylate.

22. An article according to claim 17 wherein component C is an oligomeric urethane di(meth)acrylate.

23. An article according to claim 22 wherein component C is a reaction product of 2,2,4-trimethylhexane 1,6-diisocyanate, polycaprolactone diol and 2-hydroxyethyl methacrylate.

24. An article according to claim 1 wherein component A constitutes about 10–98% by weight based on total polymerizable components.

25. An optical article having a surface with a replicated microstructure comprising a plurality of utilitarian discontinuities having an optical purpose, said optical resinous article comprising an organic resin having a glass transition temperature of at least 40° C.;

said resin being free from carbocyclic and heterocyclic polymerizable moieties and said resin being prepared by curing a radiation curable composition comprising:

(A)
(1) t-butyl (meth)acrylate,
(2) optionally N-isopropylacrylamide, N-t-butylacrylamide, N,N-dimethylacrylamide or N,N-diethylacrylamide, and
(3) optionally methyl acrylate, methyl methacrylate, ethyl acrylate, 1-propyl acrylate or a 2-(N-butylcarbamyl) ethyl (meth)acrylate, (B) at least one multifunctional (meth)acrylate or (meth)acrylamide monomer selected from the group consisting of ethylene glycol di(meth)acrylate, 1.6-hexanediol di(meth)acrylate, 2-ethyl-2-hydroxymethyl- 1,3-propanediol tri(meth)acrylate, di(trimethylolpropane) tetra(meth)acrylate, pentaerythritol tetra(meth)acrylate and N,N'-methylenebisacrylamide, and (C) optionally, at least one oligomeric multifunctional (meth)acrylate selected from the group consisting of oligomeric polyether di(meth)acrylates having a glass transition temperature of at most 23° C., di(meth)acrylates of polyester polyols and oligomers thereof, and oligomeric urethane di(meth)acrylates; and (D) at least one photoinitiator.

26. An article according to claim 25 wherein component C is a reaction product of 2,2,4-trimethylhexane 1,6-diisocyanate, polycaprolactone diol and 2-hydroxyethyl methacrylate.

27. An optical article according to claim 1 wherein said curing is carried out using ultraviolet radiation.

28. An optical article according to claim 25 wherein said curing is carried out using ultraviolet radiation.

* * * * *